(12) United States Patent
McIntire et al.

(10) Patent No.: US 7,453,391 B1
(45) Date of Patent: Nov. 18, 2008

(54) SYSTEM AND METHOD FOR ASYNCHRONOUS TRANSMISSION OF COMMUNICATION DATA TO A PERIODICALLY BLANKED RADAR RECEIVER

(75) Inventors: William K. McIntire, Sandy, UT (US); Larry S. Thomson, Bountiful, UT (US); David H. Robbins, Bountiful, UT (US); James J. Boesch, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 0 days.

(21) Appl. No.: 11/592,376

(22) Filed: Nov. 3, 2006

Related U.S. Application Data

(60) Provisional application No. 60/733,859, filed on Nov. 3, 2005.

(51) Int. Cl.
*G01S 13/00* (2006.01)
(52) U.S. Cl. .......................... 342/57; 342/30
(58) Field of Classification Search ............... 342/57, 342/30
See application file for complete search history.

(56) References Cited

U.S. PATENT DOCUMENTS

| | | | |
|---|---|---|---|
| 2,980,903 A | 4/1961 | Hagopian et al. | |
| 3,460,139 A | 8/1969 | Rittenbach | |
| 3,550,124 A | 12/1970 | Heft et al. | |
| 3,946,384 A | 3/1976 | Westaway | |
| 4,458,246 A | 7/1984 | Filipsson et al. | |
| 4,733,238 A | 3/1988 | Fiden | |
| 4,954,829 A | 9/1990 | Fiden | |
| 5,812,629 A * | 9/1998 | Clauser | 378/62 |
| 5,917,430 A | 6/1999 | Greneker, III et al. | |
| 6,285,681 B1 * | 9/2001 | Kolze et al. | 370/442 |
| 6,396,586 B1 * | 5/2002 | Wei et al. | 356/479 |
| 6,458,157 B1 * | 10/2002 | Suaning | 623/6.63 |
| 6,469,653 B1 | 10/2002 | Haynes | |
| 6,606,033 B1 | 8/2003 | Crocker et al. | |
| 6,616,611 B1 * | 9/2003 | Moehring | 600/454 |
| 7,053,797 B2 | 5/2006 | Taylor | |
| 7,102,536 B2 | 9/2006 | Scholz | |
| 7,113,107 B2 | 9/2006 | Taylor | |
| 2004/0049246 A1 * | 3/2004 | Almendinger et al. | 607/60 |
| 2004/0085938 A1 * | 5/2004 | Tiedemann et al. | 370/335 |
| 2004/0120304 A1 * | 6/2004 | Kloos et al. | 370/347 |
| 2004/0125779 A1 * | 7/2004 | Kelton et al. | 370/338 |
| 2004/0190597 A1 * | 9/2004 | Cowie et al. | 375/138 |
| 2005/0043047 A1 * | 2/2005 | Vigier et al. | 455/509 |
| 2006/0264185 A1 * | 11/2006 | Jorgensen | 455/103 |

* cited by examiner

*Primary Examiner*—Thomas H Tarcza
*Assistant Examiner*—Harry Liu
(74) *Attorney, Agent, or Firm*—Kirton & McConkie; William T. Ralston

(57) ABSTRACT

A method for asynchronously transmitting bursts of data from a communications terminal to a burst radar transceiver is disclosed. The burst radar can transmit a plurality of bursts, each separated by an inter-burst interval. An inter-burst interval length of the burst radar transceiver can be established. A burst of data at the communications terminal can be formed having a terminal burst interval length less than half the inter-burst interval of the burst radar transceiver. The burst of data can be transmitted a plurality of times from the communications terminal to the burst radar transceiver.

19 Claims, 6 Drawing Sheets

SYSTEM AND METHOD FOR ASYNCHRONOUS TRANSMISSION OF COMMUNICATION DATA TO A PERIODICALLY BLANKED RADAR RECEIVER

CROSS-REFERENCE TO RELATED APPLICATIONS AND CLAIM OF PRIORITY

Priority of U.S. Provisional patent application Ser. No. 60/733,859, filed on Nov. 3, 2005, is claimed, and is herein incorporated by reference in its entirety.

BACKGROUND

Advancements in broadband wireless communication have changed the way we live. People can now communicate and transfer information using techniques that were thought of only in science fiction literature a half century ago. A wide variety of communication resources is available for consumers, businesses, government, and military. For example, a typical consumer traveling in his car can communicate using his cell phone, listen to music over a virtually uninterrupted digital satellite radio signal while traveling cross country, receive broadband data at his computer over a WiMAX connection, and listen to a local traffic report using a high definition radio receiver.

Unfortunately, each of these means of communication typically requires the use of a separate antenna. It is very possible that a typical car, in the next 10 to 20 years, may include five to ten different antennas. Placement of that number of antennas on a car can be difficult, from both a stylistic and a functional point of view. Not only can the antennas appear unsightly, but they can also cause interference with other antennas, as well as requiring expensive wiring within the automobile between each antenna and its associated receiver.

Placement of antennas on commercial and military mobile platforms can be even more challenging. Even large military ships are often limited in the types of communication they can receive due to a lack of space available for associated antennas. Aircraft can be similarly limited. An aircraft designed to travel at high speeds may not have room for, or tolerance for an antenna designed for communicating high speed data over large distances. To overcome this problem, the military uses specialized ships and aircraft for transmitting and relaying information. While this solution generally works, it can be extremely expensive and can increase risk for soldiers in the battlefield.

SUMMARY

A method for asynchronously transmitting bursts of data from a communications terminal to a burst radar transceiver is disclosed. The burst radar can transmit a plurality of bursts, each separated by an inter-burst interval. An inter-burst interval length of the burst radar transceiver can be established. A burst of data at the communications terminal can be formed having a terminal burst interval length less than half the inter-burst interval of the burst radar transceiver. The burst of data can be transmitted a plurality of times from the communications terminal to the burst radar transceiver.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
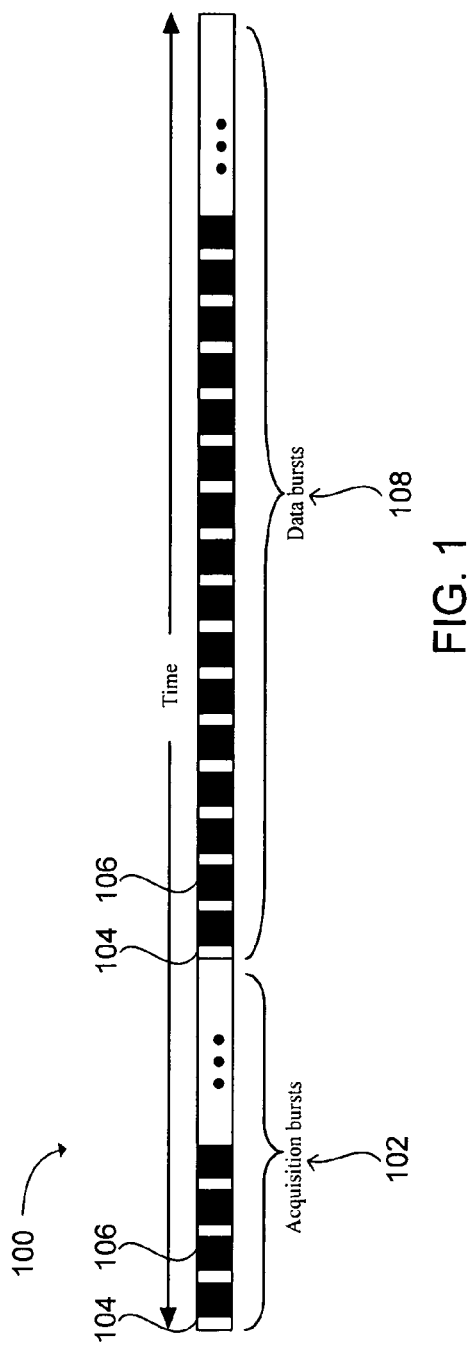
FIG. 1 is a block diagram illustrating a burst radar transmission comprising a continuous communication signal broken into segments in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One method for overcoming the electrical, spatial, and/or mechanical limitations inherent in the use of multiple antennas on a single platform is to use an antenna for multiple purposes. For example, an antenna designed for transmitting and receiving radar bursts can also be used to transmit and receive data.

A mobile platform or fixed installation containing a radar system may not have a data communications system, or the existing communication system may be insufficient for the needs of the platform. Adding or upgrading a communication system typically entails adding hardware which incurs cost, adds weight, and involves modification of the platform structure (mounting antennas, for example). These additional requirements could be reduced or eliminated if components of the radar system could be exploited for use in data communications.

For example, an aircraft may be configured with a high performance radar which is capable of collecting synthetic aperture radar (SAR) images. Synthetic aperture radar can provide detailed, high definition images. Without a high bandwidth data link, these images typically cannot be downloaded from the aircraft until the aircraft has landed. The addition of a high-speed data communications link would allow the image to be downloaded to a ground or airborne platform, or transmitted to a satellite while the aircraft is still in flight.

A two way data link using a radar system can enable a mobile radar platform to both send and receive data. A two way data link can enable critical data to be transmitted to a mobile platform that otherwise lacks the ability to receive such data. The two way data link using a radar system may also provide a higher data rate link than other communications links on the mobile platform, enabling greater amounts of data to be received than is otherwise possible. Additionally, a two way data link can improve downlink communications from the mobile platform to a receiver by enabling communication between the radar system and the receiver, such as an acknowledgement that data sent by the radar was received by the receiver.

Some radar equipment (due, for example, to thermal constraints) cannot operate continuously, and is only capable of transmitting short bursts. This is true in the case of radars installed on certain aircraft today. The radar bursts, which can be as short as several hundred nanoseconds or as long as several hundred microseconds, can still be used to carry data despite the relatively short interval of each burst. Ordinarily, data links configured to transmit large amounts of data use a continuous data signal. Transmitting large amounts of data using a bursted radar signal having short interval bursts requires a different solution, since large data files, such as high definition photographs, cannot be transmitted over a single burst.

To enable a radar transmitter to transmit the continuous data signal in discrete bursts, the communication signal can be broken into segments. Each segment can be transmitted within the length of the transmit bursts. The maximum length of these bursts will usually be constrained by the radar RF hardware, such as the need for cooling. However, other constraints are also conceivable. Use of a substantially maximum length of each burst to transmit data can be desirable. This burst length, minus any guard intervals allowed at the beginning and end of the burst, can be used to determine the length of the communication signal segments transmitted from the radar transmitter. FIG. 1 shows an example of a burst radar transmission 100 comprising a continuous communication signal broken into segments.

The burst radar transmission 100 can be configured to carry data at high data rates. The transmission can includes a plurality of bursts, with each burst having a burst transmit interval 104 followed by an inter-burst interval 106 during which the radar equipment can cool. The inter-burst interval can be several times as long as the transmit interval. The length of the burst transmit interval in relation to the sum of the burst transmit interval and the inter-burst interval is known as the duty cycle. For example, when the inter-burst interval is twice as long as the transmit interval, the radar transmit duty cycle is ⅓, with one interval of the radar transmitter "on" followed by two intervals of the radar transmitter being "off", for a total of three intervals. The actual duty cycle of a radar transmitter can vary, depending on the characteristics of the hardware and data link management issues, as can be appreciated.

The burst radar transmission can include one or more acquisition bursts 102. The acquisition bursts can include training sequences, frame synchronization sequences, and other sequences useful in synchronizing a receiver with the burst transmissions. The acquisition burst(s) can be followed by payload (data) bursts, configured to carry data at relatively high rates. This is discussed more fully in the commonly-owned copending application Ser. No. 11/592,536, filed Nov. 3, 2006, titled "System and Method for Transmitting High Data Rate Information from a Radar System", which is herein incorporated by reference in its entirety.

Synchronization with Radar Hardware

A modem is typically used to modulate data onto a carrier signal to form a communication signal. It is convenient if the modem is able to control the timing of the transmit intervals in the RF hardware. This way, synchronization of the communication signal segments with the radar burst transmit intervals 104 is easily accomplished. In some cases, however, this is not possible. Certain modem radar systems in use today present just such a case, wherein the radar cannot accept control of the transmit intervals from an external source. In this case, the radar hardware can provide some sort of gate signal so that the radar modem can know the timing of the transmit burst intervals. The radar hardware may also provide a reference clock signal to which the gate signal is synchronized.

Figure 2:
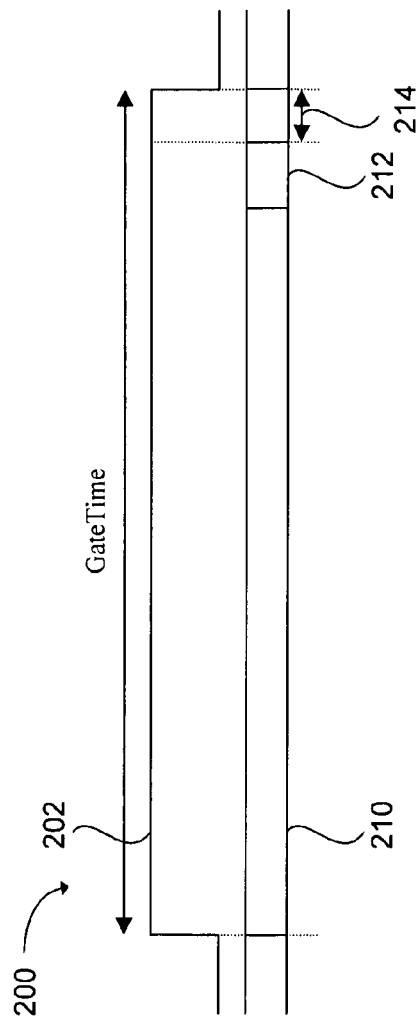
FIG. 2 is a block diagram illustrating a burst radar transmission comprising an acquisition signal segment in accordance with an embodiment of the present invention.

FIG. 2 shows one embodiment of a gate signal 202. The gate signal 202 can be provided by the RF hardware to the modem. An acquisition signal segment 200 can be synchronized to the gate signal. The gate signal may be continuously provided by the RF hardware to the modem. Alternatively, a reference clock can be provided by the radar radio frequency equipment (RFE) or some other source within the RF hardware. The gate signal can be made synchronous with this reference clock signal. The communications modem can therefore use this clock for a reference, and upon receiving any gate signal rising edge, the modem can predict future rising and falling edges by counting clock cycles, without the need for further gate signal detection.

The acquisition signal segment 200 can include an idle sequence 210 that can be transmitted during the acquisition burst to enable carrier and symbol acquisition. The idle sequence can be a sequence well suited for rapid acquisition, such as an alternating +1, −1 sequence, or some other alternating sequence configured to enable rapid acquisition. Additionally, a stop frame sync word 212 can be included at the end of the acquisition burst to signal an end of the burst. A separate communications terminal, at which the acquisition signal is received, can acquire the burst timing by detecting the stop frame sync word. A guard period 214 can be located between the stop sequence and the end of the acquisition burst. The guard period can be just long enough to ensure that the tail of the data doesn't get clipped.

The radar system can be configured to receive data and/or radar signals during the inter-burst interval 106 (FIG. 1). For example, radar bursts can be transmitted during the radar burst transmit intervals 104. Reflections from the radar bursts can be received during the inter-burst intervals. Alternatively, data can be transmitted during the radar burst transmit intervals and data can be received during the inter-burst intervals that has been transmitted from the separate communications terminal. However, as previously discussed, the modem may have no control over the timing of the inter-burst intervals. The modem may only be able to receive data during the inter-burst interval. Thus, any information that is transmitted from a separate communications terminal to the radar system transceiver is typically received only during the inter-burst intervals.

Figure 3:
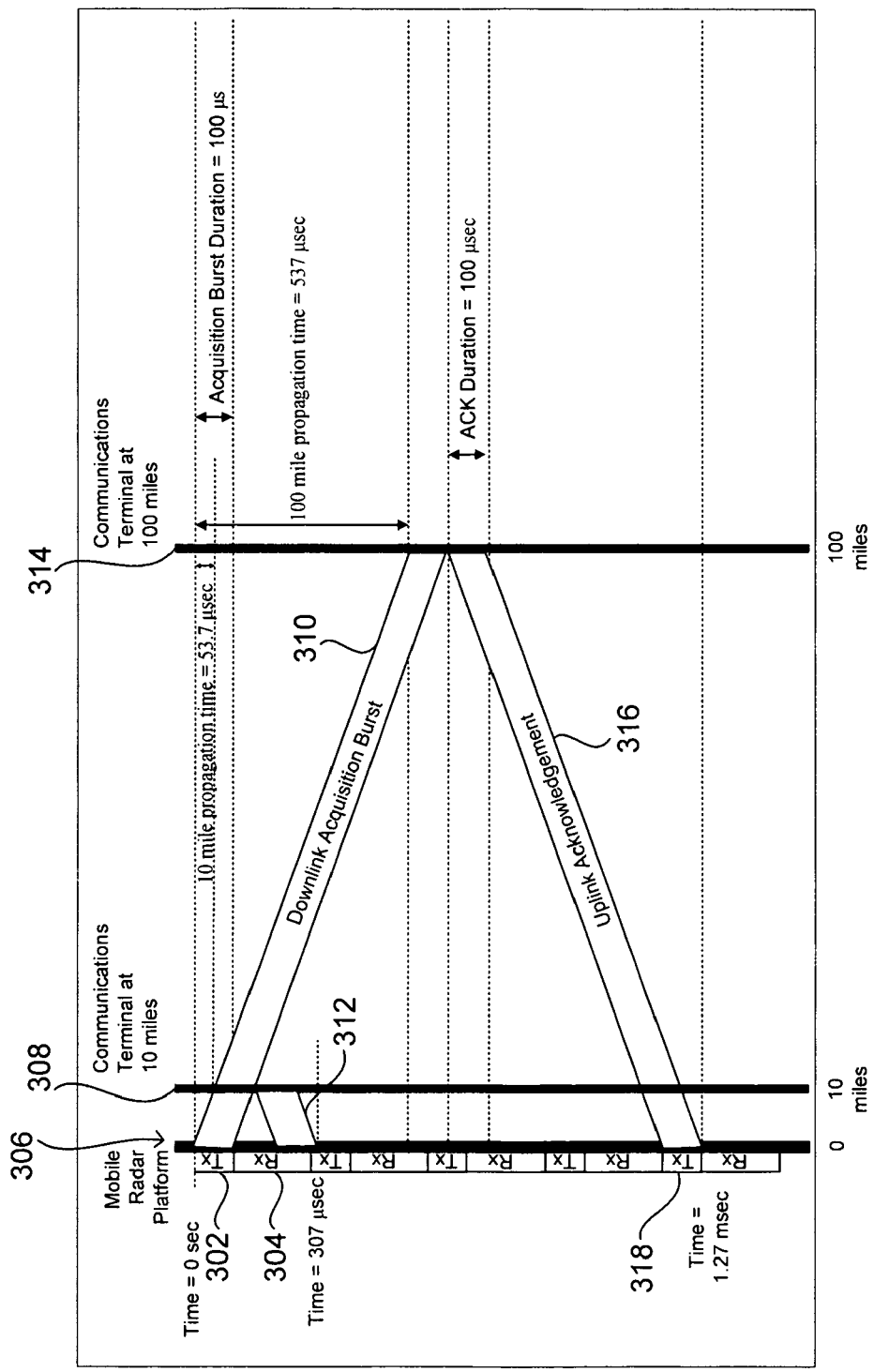
FIG. 3 is an illustration showing the difficulty of transmitting a signal from a mobile radar platform to a communications terminal and transmitting a signal back to the radar platform to be received during an inter-burst period in accordance with an embodiment of the present invention.

For example, FIG. 3 is an example diagram depicting the difficulty of achieving two way communications between a radar transceiver having an inter-burst interval and a separate communications terminal. The left axis shows transmit periods 302 and receive periods 304 (inter-burst intervals) of the burst radar transceiver as time progresses. The transmit period is shown to be 100 μs followed by a 200 μs receive period in this example. A 100 μs communication burst can be transmitted from the mobile radar transceiver 306 to a communications terminal 308 that is located approximately 10 miles from the radar transceiver. The communication burst, such as an acquisition burst 310, will take approximately 53.7 µs to travel the 10 miles through the atmosphere to the communications terminal, as can be appreciated. The communications terminal is shown immediately responding, after receiving the acquisition burst, with a 100 µs acknowledgement burst 312. It can be seen that the acknowledgement burst will be received at the radar transceiver (53.7 µs after leaving the communications terminal), with a portion of the acknowledgement burst arriving during the following transmit period. Specifically, the diagram shows the acknowledgement burst arriving at the radar transceiver between 207 µs and 307 µs after the start of the acquisition signal. The last 7 µs of the acknowledgement burst will arrive during a transmit period, at which point the radar transceiver may not be able to receive the signal.

Similarly, if the 100 µs acquisition burst 310 is sent from the mobile radar transceiver 306 to a communications terminal 314 that is located approximately 100 miles from the transceiver, the propagation time is 537 µs. A substantially immediate response of a 100 µs acknowledgement burst 316 by the communications terminal takes 537 µs to return to the radar transceiver, arriving between 1.17 ms and 1.27 ms after the start of the acquisition signal, with substantially all of the signal arriving during the 1.20 ms to 1.30 ms transmit period 318. In accordance with one aspect of the invention, it has been recognized that a system and method is needed for transmitting bursts of data from a communications terminal to a mobile radar transceiver having inter-burst periods.

In one embodiment, a communication terminal can be used to generate a signal that consists of terminal bursts 402 whose burst length is shorter than the interval of time between the radar transceiver's transmit bursts. The short interval terminal bursts can be received by the radar-equipped modem, but only if the bursts fall within the modem's receive period without overlapping the transmit period. To accomplish this, the communications terminal can generate bursts whose length (plus an appropriate guard period, which is small relative to the terminal burst) is equal to or less than half of the time period inter-burst interval that occurs between the radar transceiver's transmit bursts.

Figure 4:
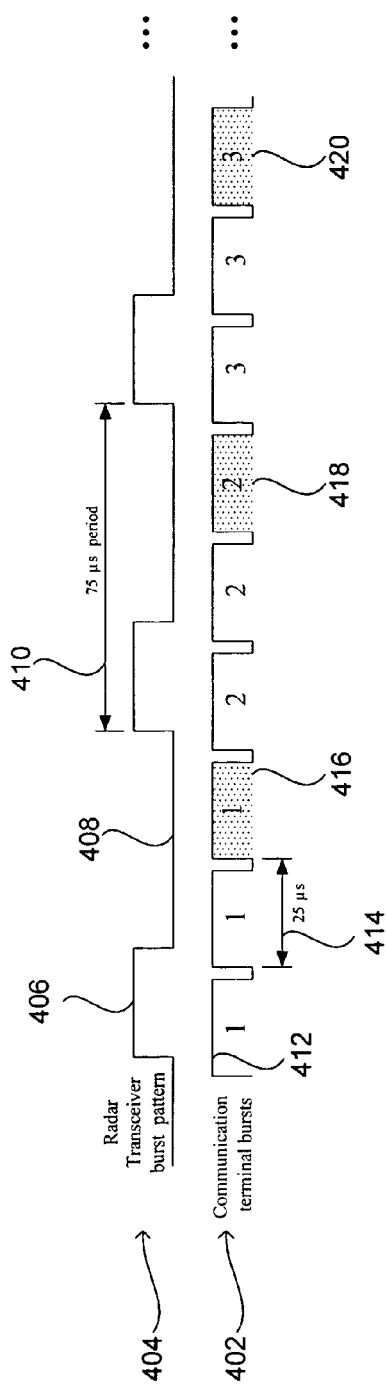
FIG. 4 is a block diagram illustrating a communications terminal burst transmit signal relative to a burst radar signal in accordance with an embodiment of the invention.

For example, FIG. 4 shows one embodiment of a communications terminal burst transmit signal 402 relative to a radar transceiver signal 404. The radar transceiver signal comprises a series of radar pulses 406 having radar pulse intervals of 25 µs separated by inter-pulse intervals 408 lasting for 50 µs. Thus, the overall radar transceiver signal has a period 410 of 75 µs in this example. The duty cycle of the signal is ⅓. The duty cycle comprises the portion of the overall signal during which it is transmitting. It is shown that a period 414 of the communications terminal signal is approximately 25 µs. The terminal signal comprises a series of terminal bursts 412 having terminal burst lengths less than or equal to half of the radar transceiver's inter-pulse period, or less than or equal to 25 µs.

The communications terminal can transmit repeat bursts containing substantially identical data several times. For example, FIG. 4 shows a first ("1") data burst transmitted three times followed by second ("2") and third ("3") bursts. The number of repetitions can be such that the time duration of a repeated set of bursts is equal to or greater than the radar transceiver signal period 410, e.g. 75 µs in the example shown in FIG. 4. In this way, even though some of the terminal bursts will collide with burst transmissions at the radar transceiver, at least one complete terminal burst can be received by the radar transceiver without interfering with a radar transmit pulse 406. It can be seen that at least one burst of the first terminal data burst 416, second terminal data pulse 418, and third terminal data pulse 420 can be received at the radar transceiver within the inter-pulse periods 408, thus enabling the data transmitted by the communications terminal to be received at the radar transceiver without requiring any synchronization between the communications terminal and radar transceiver.

Figure 5:
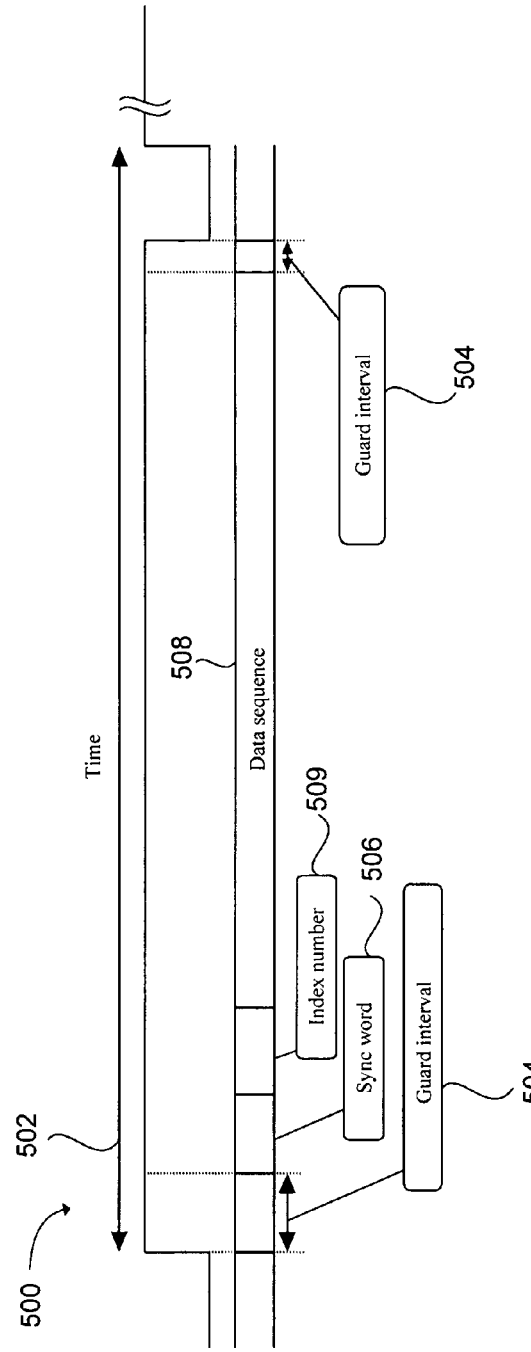
FIG. 5 is a block diagram illustrating a more detailed view of the communications terminal burst transmit signal of FIG. 4 in accordance with an embodiment of the invention.

The communications terminal burst period 500 interval length 502, as shown in FIG. 5, can be determined based on the duty cycle of the radar transceiver. For example, a radar transceiver having a duty cycle of ¼ comprises a signal having an "on" pulse interval for ¼ of the overall radar signal period, followed by three "off" intervals for an inter-pulse interval of ¾ of the overall radar signal period. To ensure a signal sent from a communications terminal is received at the radar transceiver during a next inter-pulse interval, the communications terminal pulse should have a terminal burst interval length that is less than half the radar inter-pulse interval length, or less than ⅜ of the overall radar signal period in this example.

The number of times the terminal pulse is repeated is twice the inverse of one minus the duty cycle rounded to the next whole number. Mathematically, the duty cycle can be represented in a fractional form as M/N, where M is the duty cycle numerator and N is the duty cycle denominator. In the above example, the terminal pulse can be repeated 8/3 times, which is 2.67 that is rounded up to 3. Following is a chart showing several examples based on different duty cycles, and a general formula where M and N are positive numbers.

| Radar Duty Cycle | Inter-pulse Interval | Com. Terminal Interval | Com Pulse Repeats |
|---|---|---|---|
| 3/4 | 1 − 3/4 = 1/4 | (1/4)/2 = 1/8 | 8 |
| 1/2 | 1 − 1/2 = 1/2 | (1/2)/2 = 1/4 | 4 |
| 1/3 | 1 − 1/3 = 2/3 | (2/3)/2 = 1/3 | 3 |
| 1/4 | 1 − 1/4 = 3/4 | (3/4)/2 = 3/8 | 8/3 → 3 |
| 1/8 | 1 − 1/8 = 7/8 | (7/8)/2 = 7/16 | 16/7 → 3 |
| 1/64 | 1 − 1/64 = 63/64 | (63/64)/2 = 63/128 | 128/63 → 3 |
| 1/500 | 1 − 1/500 = 499/500 | (499/500)/2 = 499/1000 | 1000/499 → 3 |
| M/N | 1 − M/N | (1 − M/N)/2 | $\left\lceil \dfrac{2N}{N-M} \right\rceil$ |

It can be seen in the above chart that a radar duty cycle of ⅓ can be the most efficient for a radar transceiver configured to transmit bursts and receive pulsed bursts from a communications terminal that isn't synchronized with the radar. This is based on the previously discussed requirements that the communications terminal pulse interval is less than or equal to half the width of the radar's inter-pulse interval, and the terminal pulse is repeated a sufficient number of times that the time duration of a repeated set of bursts is equal to or greater than the radar transceiver signal period 410 (FIG. 4).

When the radar transceiver duty cycle is greater than ⅓, such as the example shown where the duty cycle is ¾, then the communications terminal pulse size is substantially shorter, at ⅛ of the radar signal period in this example. Additionally, the same data pulse is repeated 8 times over the radar period to enable the plurality of pulses to be equal to or longer than the radar transceiver signal period 410. The short pulse size and the high number of repeats of the same data can reduce the efficiency of asynchronous transmission from the communication terminal to the radar transceiver.

Conversely, when the duty cycle of the radar transceiver is less than ⅓, even much less than ⅓, the communications pulse is still repeated three times to ensure that one of the pulses is received by the radar during the radar's inter-pulse interval. However, the efficiency of the radar can be decreased when the duty cycle of the radar is fairly low. Thus, it appears that a radar duty cycle of ⅓ can be the most efficient for transmitting modulated or unmodulated bursts from a radar transceiver and receiving pulsed bursts from a communications terminal that isn't synchronized with the radar transceiver. The ⅓ duty cycle can also enable the radar transceiver to be used effectively to transmit and receive radar and/or data during the ⅓ "on" period.

The communications terminal burst period 500 can include guard intervals 504 at the beginning and end of the burst, a synchronization sequence comprising a sync word 506, and a data sequence 508. The guard intervals may be of identical lengths at the beginning and end of each burst, or alternatively, the intervals may have different lengths. The guard intervals can be added to guard against clipping of data as the mobile radar transceiver shifts between transmit and receive modes. A guard interval at the beginning of the burst can be used to enable a power amplifier in the receiver of the radar transceiver to become substantially stable prior to data being detected in the received terminal bursts. The actual length of the guard intervals is dependent on the design of the receiver and the length of the inter-burst intervals. Alternatively, the guard intervals at the beginning and/or ending of the communication signal segment may be omitted.

It is possible that two or more repeated bursts containing identical data can be received at the burst radar transceiver. An index number 509 can be located within the communications terminal burst period to enable the burst radar transceiver to identify duplicate bursts of data received from the communications terminal. Since each burst will likely only be repeatedly transmitted a small number of times, the index number can be a relatively small number. For example, a 3 bit index number can be included in every terminal burst 500. The index number may be located at a convenient location within the burst, such as directly after a synchronization sequence 506.

The synchronization sequence, or sync word 506, can be used to enable the radar transceiver to become synchronized with the received communication signal segment. The sync sequence can be kept relatively short to minimize the amount of overhead in the communication terminal burst segment. Paradoxically, the higher the rate at which data is transmitted, the more efficient the transmission of data can be using the communication terminal bursts as carriers. For example, for a communications terminal burst duration having a length of 25 microseconds and being repeated three times, the following data rate statistics, which assume QPSK modulation, can be derived:

Example #1: High Rate

Burst Data rate: 274 Mbps

Symbol rate: 137 Msymbols/sec

Burst duration: 25 microseconds

Burst size: 3425 symbols

Sync word length: 16 symbols

Sync word fraction of burst: 0.5%

Payload bits transmitted per sec: 90.9 Mb/s

Example #2: Medium Rate

Burst Data rate: 10 Mbps

Symbol rate: 5 Msymbols/sec

Burst duration: 25 microseconds

Burst size: 125 symbols

Sync word length: 16 symbols

Sync word fraction of burst: 12.8%

Payload bits transmitted per sec: 2.9 Mb/s

Example #3: Low Rate

Burst Data rate: 1.28 Mbps

Symbol rate: 640 ksymbols/sec

Burst duration: 25 microseconds

Burst size: 16 symbols

Sync word length: 16 symbols

Sync word fraction of burst: 100%

Payload bits transmitted per sec: 0

Example #4: Even Lower Rate

Burst Data rate: 80 kbps

Symbol rate: 40 ksymbols/sec

Burst duration: 25 microseconds

Burst size: 1 symbol

Sync word length: Doesn't matter

Sync word fraction of burst: Much longer than a burst

It is shown that a rate of greater than 1.28 Mbps is required to transmit any data beyond a 16 bit sync word on a 25 microsecond burst. At relatively high rates, such as 274 Mbps, the amount of overhead devoted to synchronization, about 0.5%, becomes relatively insubstantial. Thus, to transfer large data files, such as SAR image files, over a reasonable amount of time, a relatively high data rate is needed to minimize the amount of overhead in each burst that is used to synchronize a receiver to the signal. Other factors such as error correction coding can cause reduced bit rates unless higher transmit rates are used.

Transmitting at a high data rate, however, typically entails the design of a system configured to transmit a signal having a relatively high signal to noise density ratio. A communication signal should have a sufficient amount of energy in each bit transmitted to enable the receiver to distinguish between received symbols. Thus, as the rate of bits transmitted increases, so should the amount of power. Transmitting a communication signal at a rate of 274 Mbps can use over 200 times more power than transmitting at a rate of 1.28 Mbps when all other system variables are held constant. Therefore, the communications terminal typically uses a fairly large amount of power when transmitting at high data rates.

High data rates may be desired when transferring high definition images to a mobile platform using the radar transceiver to receive the data during the inter-burst intervals. For example, a high resolution map may be transferred to the platform. The map can be used to enable a person to direct the mobile platform to a desired location or relay other kinds of desired information.

Alternatively, a lower data rate may be used to transmit information to the mobile radar transceiver. In many situations, it is not necessary to transmit a large amount of data to a mobile platform using the radar transceiver to receive the data. A lower power communications terminal having reduced complexity and cost can be used to transmit information at lower data rates, such as 10 Mb/s. In the above examples, a 10 Mb/s transmit rate allows approximately 125 symbols to be transmitted in each 25 microsecond burst. A 16 bit sync word comprises about 13% overhead dedicated to the sync word. This amount of overhead may be reasonable based on the amount of data that is typically transmitted to the mobile radar transceiver.

Longer inter-burst intervals can be employed in the radar transceiver, such as a 100 μs radar transceiver burst interval and a 200 μs inter-burst interval, enabling communications terminal burst intervals of around 100 μs. The relatively larger burst intervals can enable the amount of overhead devoted to sending a sync signal to be significantly decreased. For example, for an inter-burst interval of 200 μs and a 100 μs communications terminal burst interval, a 10 Mb/s signal can transmit up to 500 symbols. Using a 16 bit sync word amounts to a 3.2% overhead dedicated to the sync word. The actual lengths of the inter-burst intervals can vary from several hundred nanoseconds to several hundred microseconds, depending upon the selected hardware in the radar transceiver and data link management issues, as can be appreciated.

Figure 6:
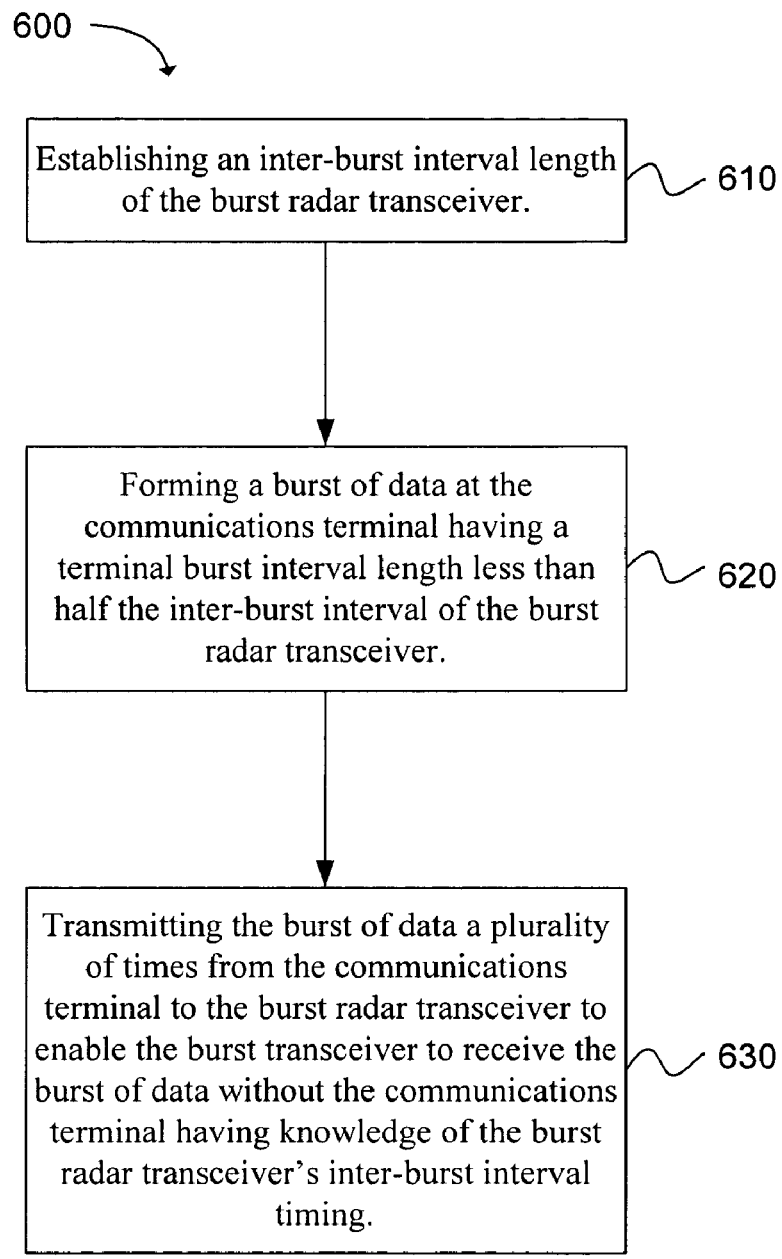
FIG. 6 is a flow chart depicting a method for asynchronously transmitting bursts of data from a communications terminal to a burst radar transceiver in accordance with an embodiment of the present invention.

Another embodiment of the invention provides a method 600 for asynchronously transmitting bursts of data from a communications terminal to a burst radar transceiver, as depicted in the flow chart of FIG. 6. The burst radar transceiver can be configured to transmit a plurality of bursts. Each burst transmitted by the radar transceiver can be separated by an inter-burst interval. The method includes the operation of establishing an inter-burst interval length of the burst radar transceiver, as shown in block 610. The inter-burst interval length of the burst radar transceiver may be known a priori. Alternatively, the inter-burst interval length can be determined by transmitting at least two radar bursts from the burst radar transceiver to the communications terminal, wherein the at least two radar bursts are separated by the inter-burst interval to enable the communications terminal to determine the inter-burst interval length. The radar bursts may be unmodulated or modulated with data.

The method 600 further includes the operation of forming a burst of data at the communications terminal having a terminal burst interval length less than half the inter-burst interval of the burst radar transceiver, as shown in block 620. Additional information can also be included, such as a sync word to enable a clock reference at the burst radar transceiver to be substantially synchronized with the burst of data. The terminal burst interval length can vary in length from a few hundred nanoseconds to several hundred microseconds. For example, the terminal burst interval length may be less than 500 microseconds. In another embodiment, the terminal burst interval length may be less than 25 microseconds.

The method 600 additionally includes transmitting the burst of data a plurality of times from the communications terminal to the burst radar transceiver to enable the burst transceiver to receive the burst of data without the communications terminal having knowledge of the burst radar transceiver's inter-burst interval timing, as shown in block 630. The burst of data can be transmitted with substantially identical data a sufficient number of times such that a time duration of the plurality of transmitted bursts is equal to or greater than a burst radar transceiver signal period. In one embodiment, at least one hundred symbols can be modulated onto each burst of data, though the actual number of symbols included in each burst can vary from just a few more than the overhead symbols to several thousand symbols per burst.

Figure 7:
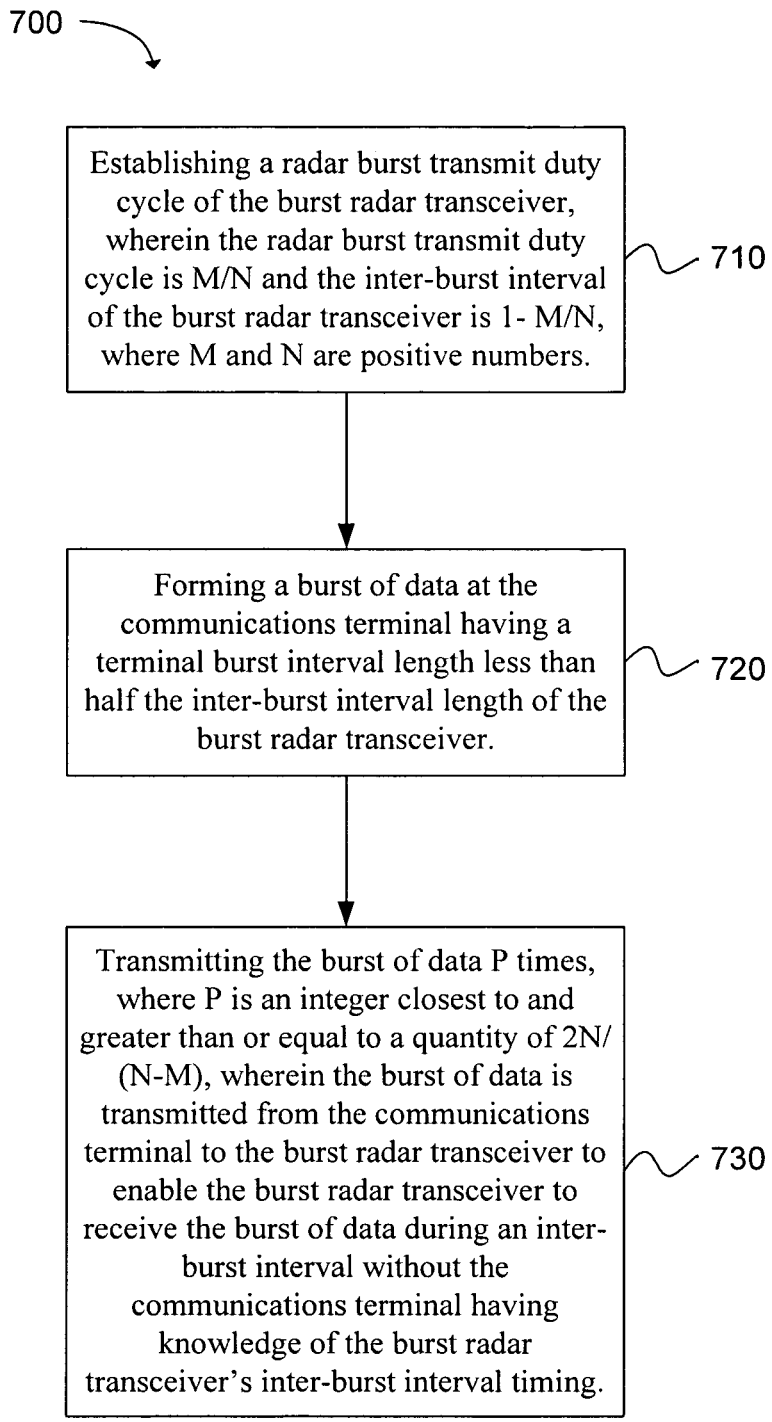
FIG. 7 is a flow chart depicting an additional method for asynchronously transmitting bursts of data from a communications terminal to a burst radar transceiver in accordance with an embodiment of the present invention.

Another embodiment of the invention provides a method 700 for asynchronously transmitting bursts of data from a communications terminal to a burst radar transceiver, as depicted in the flow chart of FIG. 7. The burst radar transceiver can be configured to transmit a plurality of bursts. Each burst can be separated by an inter-burst interval. The method includes the operation of establishing a radar burst transmit duty cycle of the burst radar transceiver, wherein the radar burst transmit duty cycle is M/N and the inter-burst interval of the burst radar transceiver is 1−M/N, where M and N are positive numbers, as shown in block 710. An additional operation includes forming a burst of data at the communications terminal having a terminal burst interval length less than half the inter-burst interval length of the burst radar transceiver, as shown in block 720. The method further includes the operation of transmitting the burst of data P times, where P is an integer closest to and greater than or equal to a quantity of 2N/(N−M), wherein the burst of data is transmitted from the communications terminal to the burst radar transceiver to enable the burst radar transceiver to receive the burst of data during an inter-burst interval without the communications terminal having knowledge of the burst radar transceiver's inter-burst interval timing, as shown in block 730.

Figure 8:
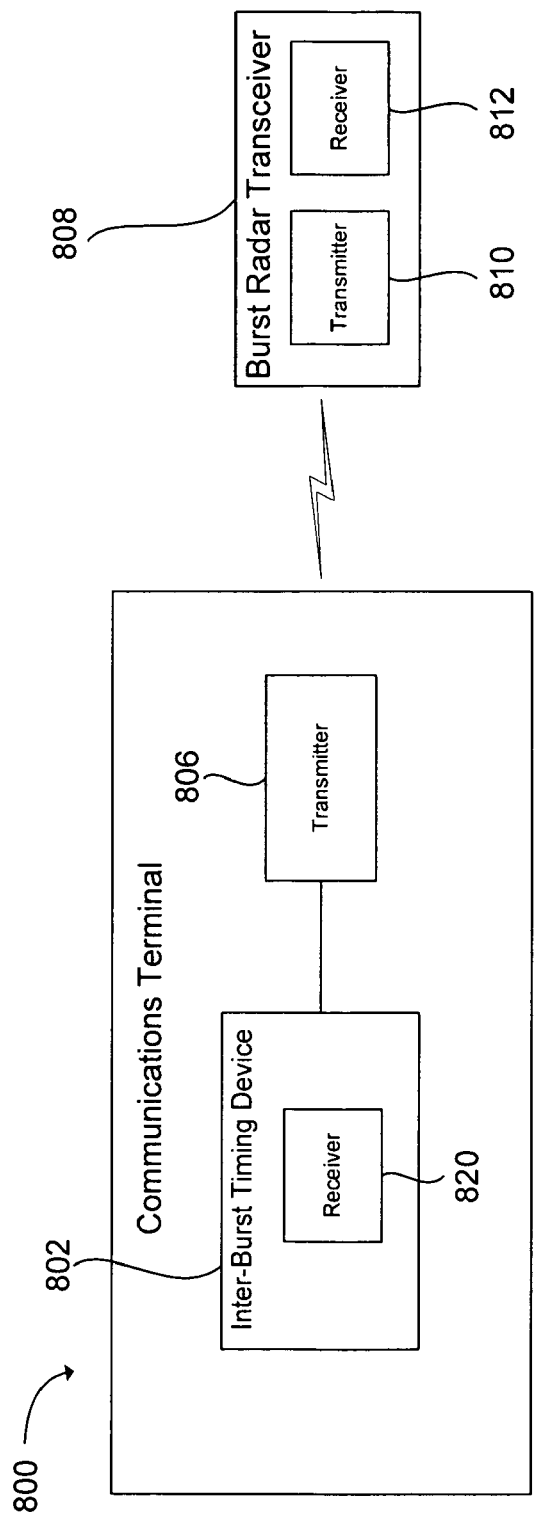
FIG. 8 is a block diagram of a system for asynchronously transmitting bursts of data from a communications terminal to a burst radar transceiver in accordance with an embodiment of the present invention.

Another embodiment of the invention provides a system for asynchronously transmitting bursts of data from a communications terminal 800 to a burst radar transceiver 808, as shown in FIG. 8. The communications terminal can include an inter-burst timing device 802 configured to establish a length of inter-burst intervals of the burst radar transceiver 808. The inter-burst interval length may be known a priori, as previously mentioned. Alternatively, the inter-burst timing device may receive 820 at least two radar bursts transmitted 810 from the burst radar transceiver. The at least two radar bursts can be separated by the inter-burst interval to enable the inter-burst timing device to determine the inter-burst interval length.

The communications terminal 800 can asynchronously transmit 806 bursts of data to the burst radar transceiver that are configured to be received 812 at the radar transceiver during inter-burst intervals. The bursts of data each have a terminal burst interval length less than or equal to half of the inter-burst interval length of the burst radar transceiver. The bursts of data can be repeated a sufficient number of times such that a time interval of the plurality of transmitted bursts is equal to or greater than the burst radar transceiver signal period, as previously discussed. This can ensure that at least one of each of the plurality of transmitted bursts of data is received at the burst radar transceiver. Asynchronous transmission of data from the communications terminal to the burst radar transceiver, as has been described, allows data to be asynchronously transmitted to the burst radar transceiver without the need for additional synchronization hardware at the communications terminal. Thus, the present application provides a simple solution for asynchronously transmitting data to a burst radar transmitter.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of asynchronously transmitting bursts of data from a communications terminal to a burst radar transceiver configured to transmit a plurality of bursts, each burst separated by an inter-burst interval, comprising:

establishing an inter-burst interval length of the burst radar transceiver;

forming a burst of data at the communications terminal having a terminal burst interval length less than half the inter-burst interval of the burst radar transceiver; and transmitting the burst of data a plurality of times from the communications terminal to the burst radar transceiver to enable the burst radar transceiver to receive the burst of data, wherein the burst of data is transmitted at least P times, wherein P is an integer closest to and greater than or equal to $2N/(N-M)$, N and M are positive numbers, and M/N is a duty cycle of the burst radar transceiver.

2. A method as in claim 1, wherein establishing the inter-burst interval length further comprises knowing the inter-burst interval length at the communications terminal prior to receiving information from the burst radar transceiver.

3. A method as in claim 1, wherein establishing the inter-burst interval length further comprises transmitting at least two radar bursts from the mobile radar transceiver to the communications terminal, wherein the at least two radar bursts are separated by the inter-burst interval to enable the communications terminal to determine the inter-burst interval length.

4. A method as in claim 3, wherein transmitting the at least two radar bursts further comprises transmitting at least two radar bursts, wherein the radar bursts include data modulated onto the radar bursts to form modulated radar burst signals.

5. A method as in claim 1, wherein transmitting the burst of data a plurality of times further comprises transmitting the burst of data a sufficient number of times such that a time duration of the plurality of transmitted bursts is equal to or greater than a burst radar transceiver signal period.

6. A method as in claim 1, further comprising adding a sync word to the burst of data transmitted from the communications terminal to enable a clock reference at the burst radar transceiver to be substantially synchronized with the burst of data.

7. A method as in claim 1, wherein transmitting the burst of data further comprises transmitting the burst of data having burst lengths less than 500 microseconds.

8. A method as in claim 1, wherein transmitting the burst of data further comprises transmitting the burst of data having burst lengths less than 25 microseconds.

9. A method as in claim 1, wherein transmitting the burst of data further comprises transmitting the burst of data having at least 100 symbols modulated onto the burst of data.

10. A method as in claim 1, wherein transmitting the burst of data further comprises transmitting each burst from the communications terminal to the burst radar transceiver three consecutive times with the same data to enable the burst radar transceiver to receive the burst of data without the communications terminal having knowledge of the burst radar transceiver's inter-burst interval timing.

11. A method as in claim 1, further comprising adding an index number to each burst of data to enable the burst radar transceiver to identify duplicate bursts of data.

12. A method as in claim 1, further comprising receiving the burst of data at the burst radar transceiver.

13. A method of asynchronously transmitting bursts of data from a communications terminal to a burst radar transceiver configured to transmit a plurality of bursts each separated by an inter-burst interval, comprising:

establishing a radar burst transmit duty cycle of the burst radar transceiver, wherein the radar burst transmit duty cycle is M/N and the inter-burst interval of the burst radar transceiver is 1−M/N, where M and N are positive numbers;

forming a burst of data at the communications terminal having a terminal burst interval length less than half the inter-burst interval length of the burst radar transceiver; and transmitting the burst of data P times, where P is an integer closest to and greater than or equal to a quantity of $2N/(N-M)$, wherein the burst of data is transmitted from the communications terminal to the burst radar transceiver to enable the burst radar transceiver to receive the burst of data during an inter-burst interval without the communications terminal having knowledge of the burst radar transceiver's inter-burst interval timing.

14. A method as in claim 13, further comprising receiving the burst of data at the burst radar transceiver.

15. A method as in claim 14, wherein receiving the burst of data at the burst radar transceiver occurs during the inter-burst interval.

16. A method as in claim 14, wherein receiving the burst of data at the burst radar transceiver occurs during the inter-burst interval.

17. A system for asynchronously transmitting bursts of data from a communications terminal to a burst radar transceiver, comprising an inter-burst timing device to establish a length of inter-burst intervals of the burst radar transceiver;

a communications device for forming a burst of data at the communications terminal having a terminal burst interval length less than half the inter-burst interval of the burst radar transceiver; and a transmitter coupled to the communications terminal, the communications device, and the inter-burst timing device, wherein the transmitter is configured to transmit the burst of data a plurality of times to enable the burst of data to be received at the burst radar transceiver during the inter-burst interval, wherein the burst of data is transmitted at least P times, wherein P is an integer closest to and greater than or equal to $2N/(N-M)$, N and M are positive numbers, and M/N is a duty cycle of the burst radar transceiver.

18. A system as in claim 17, wherein the inter-burst timing device is configured to receive at least two radar bursts that are separated by the inter-burst interval to enable the inter-burst timing device to determine the inter-burst interval length.

19. A means for asynchronously transmitting bursts of data from a communications terminal to a burst radar transceiver configured to transmit a plurality of bursts each separated by an inter-burst interval, comprising:

a determining means for establishing an inter-burst interval length of the burst radar transceiver;

a communications means for forming a burst of data at the communications terminal having a terminal burst interval length less than half the inter-burst interval of the burst radar transceiver; and a transmission means for transmitting the burst of data a plurality of times from the communications terminal to the burst radar transceiver to enable the burst transceiver to receive the burst of data without knowledge of the burst radar transceiver's inter-burst interval timing, wherein the burst of data is transmitted at least P times, wherein P is an integer closest to and greater than or equal to $2N/(N-M)$, N and M are positive numbers, and M/N is a duty cycle of the burst radar transceiver.

* * * * *

UNITED STATES PATENT AND TRADEMARK OFFICE
CERTIFICATE OF CORRECTION

| | | |
|---|---|---|
| PATENT NO. | : 7,453,391 B1 | Page 1 of 1 |
| APPLICATION NO. | : 11/592376 | |
| DATED | : November 18, 2008 | |
| INVENTOR(S) | : McIntire et al. | |

It is certified that error appears in the above-identified patent and that said Letters Patent is hereby corrected as shown below:

In column 4, line 8, "Certain modem radar systems" should be "Certain modern radar systems"

Signed and Sealed this

First Day of June, 2010

David J. Kappos
*Director of the United States Patent and Trademark Office*